Patented Jan. 18, 1949

2,459,630

UNITED STATES PATENT OFFICE 2,459,630

RECTIFIER

Charles S. Duncan, Wilkinsburg, Pa., assignor to Westinghouse Electric Corporation, East Pittsburgh, Pa., a corporation of Pennsylvania No Drawing. Application October 29, 1945, Serial No. 625,452

4 Claims. (Cl. 175—366)

My invention relates to copper oxide rectifiers and in particularly relates to an improved type of copper oxide rectifier which is subjected to a novel heat treating schedule.

One object of my invention is to provide a novel type of copper oxide rectifier.

Another object of my invention is to provide a novel process for treating copper oxide units in the manufacture of devices exhibiting a unilateral conductivity.

Still another object of my invention is to provide a copper oxide rectifier in which the reverse current is lower than in copper oxide rectifiers of the prior art.

Still another object of my invention is to provide copper oxide rectifiers which can be operated at higher voltage per rectifier plate than copper oxide rectifiers of the prior art.

Still another object of my invention is to provide a copper oxide rectifier capable of being operated at a greater power output for a given effectiveness of cooling them than can copper oxide rectifiers of the prior art.

Still another object of my invention is to provide a copper oxide rectifier having a higher efficiency of operation than copper oxide rectifiers of the prior art.

A still further object of my invention is to provide a copper oxide rectifier in which the electrical characteristics undergo less change or "ageing" during operative life than copper oxide rectifiers of the prior art.

Other objects of my invention will become apparent upon reading the following description of the rectifier and the process of making it which embodies the principles of my invention.

As is well known in the art, dry contact rectifiers which have highly desirable characteristics for many purposes can be made by forming on the surface of copper discs or plates, a thin layer of cuprous oxide; and providing some form of conductive contact layer, such as Schoop-sprayed metal deposited on a thin graphite layer covering the free surface of the cuprous oxide. In accordance with one widely used process of the prior art such rectifiers are first oxidized by heating the copper nearly to 1,000° C. for 10 to 15 minutes, then annealing the units in air at around 550° C. for a similar period and then quenching them in water. The layer of cupric oxide thus formed outside the cuprous oxide is then removed by etching in diluted sulphuric acid or the like. Rectifier elements produced by this general method have a maximum operating voltage of 3 to 5 volts direct current output per unit when operating as a full wave bridge connection fed by a single-phase alternating current supply and 6 to 8 volts direct current output per unit when operated similarly from a three-phase supply connection.

Substantial improvements over such rectifiers have been found possible by employing the oxidation method described in an application, Serial No. 509,819, filed November 10, 1943, by Carl C. Hein, and entitled Rectifier elements, now abandoned. Briefly, the Hein process comprises heating the copper blanks to around 955° C. in a furnace through which substantially pure carbon dioxide is being passed for a preheating period of the order of 30 minutes; then admitting oxygen for a period of from 4 to 6 minutes, after which purified carbon dioxide is again passed through the furnace while the temperature is lowered to about 550° C. After standing for about 10 minutes at this temperature, the units are quenched in water at room temperature. Such elements operate up to 20 volts direct current each on a full wave bridge connection fed by single-phase supply and 50 volts direct current each on a similar connection fed by three-phase supply.

Rectifiers made by the improved process I describe below can be successfully operated at direct current voltages as high as 50 volts per element with a full wave bridge connection fed from a single phase supply, and 70 volts per element on a full wave three-phase bridge.

My improved rectifiers may be oxidized by following the above mentioned Hein process through the 4 to 6 minute treatment in the atmosphere containing oxygen. However I have found that by controlling the rate at which the units cool after such oxygen treatment through the 550° C. temperature and preferably continuing the slow temperature drop down to a temperature around 347° C., the entire cooling period consuming from 2 to 4 hours, a great improvement in performance of the rectifiers even over those made by the Hein process is attained. This cooling after oxidation may be carried out in at atmosphere of carbon dioxide. The shape of the cooling curve followed during the above mentioned 2 to 4 hour drop is preferably one in which the temperature falls rather rapidly at first and then slopes off gradually approaching the lower temperature. While the precise shape of this curve may be varied in the case of certain types of rectifiers, I have found that the following schedule produces very satisfactory results in most cases and may be taken as typical. Starting at 955° C. at which oxidation has been carried out, the temperature falls to 452° C. in approximately 21 minutes then to 400° C. in about 13 minutes; then to 347° C. in one hour and 40 minutes; then remaining at 347° C. to make the total time elapsed during cooling three hours. At the termination of three hours, the units are quenched in water.

While I have described the application of my process to units oxidized in accordance with the Hein process above-mentioned, it is within the purview of my invention to employ it with rectifier discs oxidized by other methods known to the art.

To illustrate the improvement resulting from the above described heat treating process, impression of 15 volts per unit in the reverse direction passes only from 0.35 to 0.55 milliampere in the case of the above described units whereas the same voltage passes 0.7 to 1.1 milliamperes in the case of the units made by the Hein process above described; and the same voltage passes 5 to 10 milliamperes in the case of copper oxide rectifiers made by the prior art process described in the prior art process of this specification. This shows a reverse current under standard test conditions for my unit which is only about 1/20 of that exhibited by conventional prior art units. Since the reverse current is a large factor in determining the amount of heat dispersed in dry contact rectifier units, and this heat dissipated largely controls the amount of voltage which the units can supply to a direct current load, it is obvious that my units represent a wide advance over conventional prior art rectifiers.

In accordance with another standard test frequently applied to dry contact rectifiers, these voltages required to pass ½ an ampere through a disc 1½" in outside diameter with a ½" hole in it, my units require 1.2 to 1.9 volts; units made by the Hein process above described require 0.9 to 1.5 volts whereas conventional rectifiers made in accordance with the first process described in this application require from .4 to 0.45 volt. In view of the higher output voltage per unit than either the Hein or the first-described process units made by my process have a much lower ratio of internal voltage drop to output voltage, and so have a higher electrical efficiency, than rectifiers made by either of the other processes I have mentioned. Likewise I have found rectifier units made by my process to undergo far less variation of electrical characteristics with operation than do other rectifiers.

I claim as my invention:

1. The method of heat treating oxidized copper units exhibiting unilateral conductivity which comprises reducing their temperature from that of oxidation to that at the end of the annealing during a period of about 3 hours, dropping to the neighborhood of 450° C. in a period in the order of 21 minutes, then dropping to a temperature in the neighborhood of 400° C. in a period in the order of 13 minutes, then dropping to about 350° C. in about one hour and 40 minutes, and remaining at the last mentioned temperature until the expiration of the three hour period whereupon the units are reduced rapidly to room temperature.

2. The method of manufacturing copper oxide rectifiers which comprises preheating copper at a temperature near the melting point of copper for a period of the order of thirty minutes in substantially pure carbon dioxide, maintaining the same temperature for a period of 4 to 6 minutes in an oxidizing atmosphere, thereafter cooling the units in an atmosphere of substantially pure carbon dioxide during an annealing period of from 2 to 4 hours, the temperature falling during this annealing period first at a relatively rapid rate and thereafter at a substantially slower rate, and then rapidly reducing the units to room temperature.

3. The method of manufacturing copper oxide rectifiers which comprises preheating copper at a temperature near the melting point of copper for a period of the order of thirty minutes in substantially pure carbon dioxide, maintaining the same temperature for a period of 4 to 6 minutes in an oxidizing atmosphere, thereafter cooling the units in an atmosphere of substantially pure carbon dioxide during an annealing period of the order of 3 hours, the temperature falling during this annealing period first at a relatively rapid rate and thereafter at a substantially slower rate, and then rapidly reducing the units to room temperature.

4. The method of manufacturing copper oxide rectifiers which comprises preheating copper at a temperature near the melting point of copper for a period of the order of thirty minutes in substantially pure carbon dioxide, maintaining the same temperature for a period of 4 to 6 minutes in an oxidizing atmosphere, thereafter cooling the units in an atmosphere of substantially pure carbon dioxide during an annealing period of the order of 3 hours, the temperature falling to the neighborhood of 450° C. in a time of the order of 21 minutes, then to a temperature in the order of 400° C. during a period of 13 minutes, then falling to a temperature of the order of 350° C. in a time of the order of one hour and 40 minutes, and remaining at the last mentioned temperature until the termination of the annealing period whereupon the units are quickly reduced to room temperature.

CHARLES S. DUNCAN.

REFERENCES CITED

The following references are of record in the file of this patent:

UNITED STATES PATENTS

| Number | Name | Date |
|---|---|---|
| 1,936,792 | Kahler | Nov. 28, 1933 |

FOREIGN PATENTS

| Number | Country | Date |
|---|---|---|
| 480,594 | Great Britain | Feb. 21, 1938 |
| 483,088 | Great Britain | Apr. 12, 1938 |